No. 861,542. PATENTED JULY 30, 1907.
B. C. SEATON.
WHEEL.
APPLICATION FILED JUNE 7, 1906.
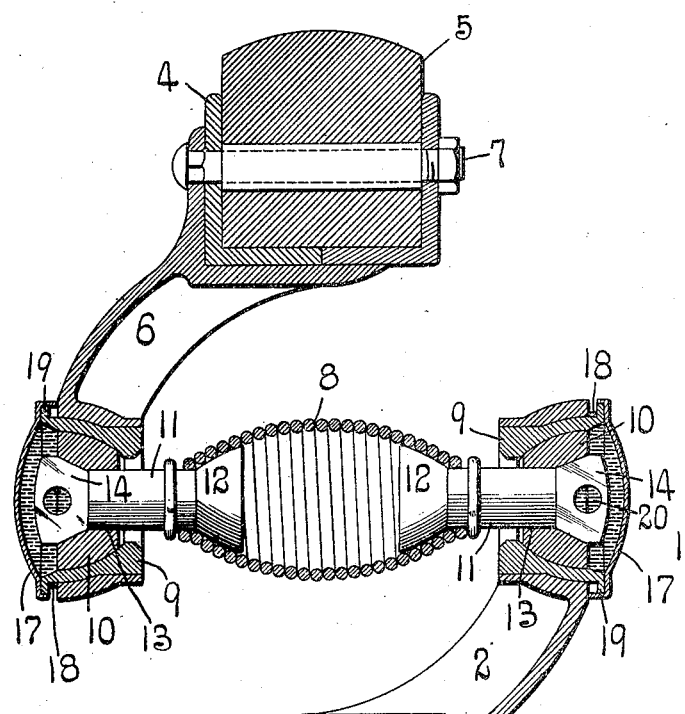
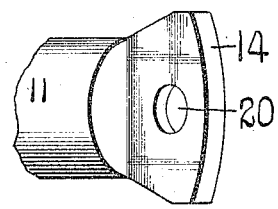
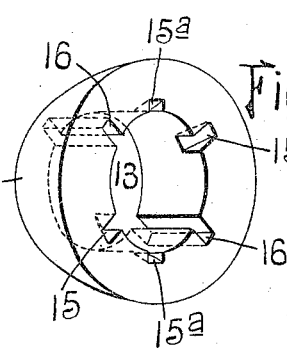
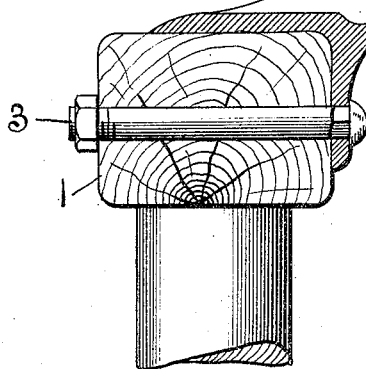
Witnesses
A. J. McCauley
Wells L. Church
Inventor:
Benjamin C. Seaton
by Bakewell Cornwall
Att'ys.

UNITED STATES PATENT OFFICE.

BENJAMIN COPLIN SEATON, OF ST. LOUIS, MISSOURI.

WHEEL.

No. 861,542. Specification of Letters Patent. Patented July 30, 1907.

Application filed June 7, 1906. Serial No. 320,668.

*To all whom it may concern:*

Be it known that I, BENJAMIN COPLIN SEATON, a citizen of the United States, residing at St. Louis, Missouri, have invented a certain new and useful Improvement in Wheels, of which the following is a full, clear, and exact description, such as will enable others skilled in the art to which it appertains to make and use the same, reference being had to the accompanying drawings, forming part of this specification, in which—

Figure 1 is a cross sectional view of a wheel provided with a rim constructed in accordance with my invention; Fig. 2 is a detail perspective view of a portion of the spring fastening device; Fig. 3 is a detail perspective view of the ball member; and Fig. 4 is a perspective view of the cap.

This invention relates to wheels and particularly to the type of wheel shown in my United States Patent No. 814,737, dated March 13, 1906.

The wheel shown in my prior patent above referred to was provided with a tire consisting of an inner rim attached to the felly of the wheel, an outer rim, and transversely arranged tension springs connected to the outer and inner rims.

One object of my invention is to provide novel means for connecting the tension springs to the outer and inner rims whereby said springs can be inserted easily and all danger of their being accidentally displaced will be obviated.

Another object of my invention is to provide means for varying the tension of the springs, and still another object is to provide means for preventing dust and dirt from entering the points at which the springs are connected to the rims.

Referring to the drawings which represent the preferred form of my invention, 1 designates the wooden felly of a wheel having arms or projections 2 secured thereto by bolts 3, the arms being arranged alternately on opposite sides of the felly. The outer rim 4 which carries the rubber tread 5 has arms or projections 6 secured thereto by bolts 7 and these arms are also arranged alternately on opposite sides of the outer rim, the arms 6 at the lefthand side of the outer rim coöperating with the arms 2 at the righthand side of the felly, as shown in Fig. 1, and those at the righthand side of the outer rim coöperating with the arms at the lefthand side of the felly.

Preferably, and as herein shown, the outer rim is made up of two angles, and the bolts 7 which connect the arms 6 to the outer rim extend through the rubber tread and thus hold it securely in position. Transversely extending tension springs 8 are arranged between the coöperating arms 2 and 6 and these springs are retained in operative position in a novel manner. Each of the arms 2 and 6 is provided at its outer end with a socket member 9 which receives a ball member 10, thus forming a universal joint.

Fastening devices 11 having flared ends 12 which extend inside of the coils at the outer ends of the springs, project through the bores 13 in the ball members 10, each of said fastening devices being provided with a tapered head 14 that is adapted to engage notches 15 in the ball member 10 and thereby securely retain said fastening device in place and also permit the same to have a universal movement. Each of the ball members 10 is provided with diametrically opposed slots 16 extending from its central bore and preferably with a plurality of pairs of notches or recesses to receive the tapered head 14 of the fastening device, said pairs of notches being diametrically opposed and being of different depth, as shown in Fig. 3, in which the notches 15ᵃ are of less depth than the notches 15. I have herein shown the ball member as being provided with only two sets of such notches but it should be understood that the number of notches with which the ball member is provided is immaterial.

In assembling the parts, the devices 11 are first connected to the springs and are then connected to the ball members by inserting the heads 14 of said devices through the slots 16 and then turning said devices until their heads rest in one of the pair of notches 15 whereby said devices will be securely retained in position, the shanks of the devices 11 being of approximately the same size as the bores of the ball members. When it is desired to vary the tension of one of the springs, either or both of the devices 11 can be turned until their heads 14 rest in notches 15 of different depth. To prevent dust and dirt from entering the ball and socket joint formed by the members 9 and 10, and also insure keeping this joint thoroughly lubricated, caps 17 are connected to the outer ends of the socket members 9 as shown in Fig. 1, and some lubricant is packed in around the ball member. The caps 17 are formed preferably as shown in Fig. 4, and are provided with spring lips 18 which snap under the flanges 19 of the socket members 9 and thus retain said caps in position.

Preferably, the heads of the fastening devices 11 are provided with openings 20 in which a hooked instrument can be inserted in the act of removing the device 11 or putting it in place.

Having thus described my invention, what I claim as new and desire to secure by Letters Patent is:

1. A wheel comprising an outer rim and an inner rim provided with coöperating projections, tension springs arranged transversely between said projections, rockable members mounted in said projections, and adjustable devices for connecting said springs to said rockable members; substantially as described.

2. A wheel comprising an outer rim and an inner rim provided with coöperating projections, ball and socket members carried by said projections, tension springs arranged between said projections, and fastening devices engaging the springs and removably connected to said ball members; substantially as described.

3. A wheel comprising an outer rim and an inner rim provided with coöperating projections, ball and socket members carried by said projections, each of said ball members being provided with a bore and a recess, springs arranged between said projections, and fastening devices for said springs which project through the bores in the ball members and are provided with means for engaging the recesses in said members; substantially as described.

4. A wheel comprising an outer rim and an inner rim provided with coöperating projections which carry ball members, said members being provided with bores and diametrically opposed slots extending from said bores, springs arranged between said projections, and means for removably connecting said springs to said ball members, said means consisting of devices which engage the springs and are provided with heads that are inserted through the diametrically opposed slots in the ball member and then turned to carry said heads out of alinement with said slots; substantially as described.

5. A wheel comprising an inner rim and an outer rim provided with coöperating projections, ball members carried by said projections and provided with a plurality of notches of different depths, springs arranged between said projections, and devices engaging said springs and provided with tapered heads which coöperate with the notches in the ball member; substantially as described.

6. A wheel comprising an outer rim and an inner rim provided with coöperating projections, ball and socket members carried by said projections, transversely extending springs connected to said ball members, and removable caps covering said ball members; substantially as described.

7. A wheel comprising an outer rim and an inner rim provided with coöperating projections, ball and socket members carried by said projections, transversely extending springs connected to said ball members, removable caps covering the ends of the socket members, and means on said caps for preventing them from being displaced; substantially as described.

In testimony whereof, I hereunto affix my signature, in the presence of two witnesses, this 31st day of May 1906.

BENJAMIN COPLIN SEATON.

Witnesses:
F. W. MAYER,
HELEN CUSHWA.